United States Patent
Lundin et al.

(10) Patent No.: US 10,061,468 B2
(45) Date of Patent: Aug. 28, 2018

(54) ENHANCED SYSTEM AND METHOD FOR PROVIDING A VIRTUAL SPACE

(71) Applicant: INTELLAFFECT INC., San Francisco, CA (US)

(72) Inventors: John A. Lundin, San Francisco, CA (US); Daniel Westfall, San Francisco, CA (US)

(73) Assignee: INTELLIFECT INCORPORATED, San Francisco, CA (US)

( * ) Notice: Subject to any disclaimer, the term of this patent is extended or adjusted under 35 U.S.C. 154(b) by 0 days.

(21) Appl. No.: 15/055,444

(22) Filed: Feb. 26, 2016

(65) Prior Publication Data

US 2016/0179297 A1    Jun. 23, 2016

Related U.S. Application Data

(63) Continuation of application No. 13/725,390, filed on Dec. 21, 2012, now Pat. No. 9,304,652.

(51) Int. Cl.

| | |
|---|---|
| G06F 3/14 | (2006.01) |
| G06F 3/0484 | (2013.01) |
| G06F 3/0481 | (2013.01) |
| G06T 13/40 | (2011.01) |
| G06F 3/01 | (2006.01) |
| A63F 13/65 | (2014.01) |
| A63F 13/825 | (2014.01) |
| A63F 13/58 | (2014.01) |

(52) U.S. Cl.
CPC ............ *G06F 3/0481* (2013.01); *A63F 13/58* (2014.09); *A63F 13/65* (2014.09); *A63F 13/825* (2014.09); *G06F 3/011* (2013.01); *G06F 3/04815* (2013.01); *G06F 3/04845* (2013.01); *G06F 3/14* (2013.01); *G06T 13/40* (2013.01)

(58) Field of Classification Search
CPC .......... G06F 3/14; G06F 3/0484; G06F 3/011; G06F 3/04815
USPC .................................. 715/757, 744
See application file for complete search history.

(56) References Cited

U.S. PATENT DOCUMENTS

| | | |
|---|---|---|
| 4,075,782 A | 2/1978 | Neuschatz |
| 5,312,287 A | 5/1994 | Chuang |
| 5,766,077 A | 6/1998 | Hongo |

(Continued)

*Primary Examiner* — Andrea Leggett
(74) *Attorney, Agent, or Firm* — S. Jafar Ali; Muncy, Geissler, Olds & Lowe, P.C.

(57) ABSTRACT

A system and method for providing a virtual space determines a representation of the virtual space based on information defining a personality of a character within the virtual space and/or information indicating a user's personality. The system and method may also determine the information defining the character's personality based on information regarding the user and/or information regarding the character. In some examples, the system and method may further determine information to facilitate a development of the user based on the information describing the user's personality. The system and method may also determine the user's personality based on information indicating user's personality. In some examples, the user's personality may be determined based on user's experiences within the virtual space. In some other examples, the user's personality may be determined based on information regarding the user that is acquired from sources external to the virtual space.

21 Claims, 7 Drawing Sheets

(56) References Cited

U.S. PATENT DOCUMENTS

| | | |
|---|---|---|
| 6,193,577 B1 | 2/2001 | Kaplan |
| 6,213,872 B1 | 4/2001 | Harada et al. |
| 6,290,565 B1 | 9/2001 | Galyean, III et al. |
| 7,131,887 B2 | 11/2006 | Hornsby et al. |
| 7,217,192 B2 | 5/2007 | Nishiyama |
| 7,244,124 B1 | 7/2007 | Merrill |
| 7,244,183 B1 | 7/2007 | England |
| 7,568,963 B1 | 8/2009 | Atsmon et al. |
| 7,591,703 B2 | 9/2009 | Zielinski et al. |
| 7,663,648 B1 | 2/2010 | Saldanha et al. |
| 7,946,919 B2 | 5/2011 | Piccionelli |
| 8,033,901 B2 | 10/2011 | Wood |
| 8,062,089 B2 | 11/2011 | Hardin et al. |
| 8,137,151 B2 | 3/2012 | Kenney |
| 8,292,689 B2 | 10/2012 | Hardin et al. |
| 8,401,912 B2 | 3/2013 | Ganz et al. |
| 8,469,766 B2 | 6/2013 | Zheng |
| 8,591,302 B2 | 11/2013 | Raichman et al. |
| 8,675,017 B2 | 3/2014 | Rose et al. |
| 8,790,180 B2 | 7/2014 | Barney et al. |
| 8,795,072 B2 | 8/2014 | Borst et al. |
| 8,926,395 B2 | 1/2015 | Zheng |
| 8,939,840 B2 | 1/2015 | Heatherly et al. |
| 8,990,715 B1 | 3/2015 | Harp et al. |
| 8,996,429 B1 | 3/2015 | Francis, Jr. et al. |
| 9,180,378 B2 | 11/2015 | Reiche |
| 9,446,319 B2 | 9/2016 | Barney et al. |
| 9,480,929 B2 | 11/2016 | Weston |
| 9,526,979 B2 | 12/2016 | Scott et al. |
| 9,610,500 B2 | 4/2017 | Colbert |
| 9,691,298 B1 | 6/2017 | Hsu-Hoffman et al. |
| 9,703,896 B2 | 7/2017 | Zhang et al. |
| 2003/0044758 A1 | 3/2003 | Ray |
| 2004/0161732 A1 | 8/2004 | Stump et al. |
| 2005/0059483 A1 | 3/2005 | Borge |
| 2005/0215171 A1 | 9/2005 | Oonaka |
| 2005/0278643 A1 | 12/2005 | Ukai et al. |
| 2006/0223637 A1 | 10/2006 | Rosenberg |
| 2007/0018390 A1 | 1/2007 | Sumner et al. |
| 2007/0073436 A1 | 3/2007 | Sham |
| 2007/0207698 A1 | 9/2007 | Stanley |
| 2007/0239479 A1 | 10/2007 | Arrasvuori et al. |
| 2008/0139080 A1 | 6/2008 | Zheng |
| 2008/0147502 A1 | 6/2008 | Baker |
| 2008/0287033 A1 | 11/2008 | Steinberg |
| 2009/0158210 A1 | 1/2009 | Cheng et al. |
| 2009/0053970 A1 | 2/2009 | Borge |
| 2009/0081923 A1 | 3/2009 | Dooley et al. |
| 2009/0100351 A1* | 4/2009 | Bromenshenkel ........ G06F 3/01 715/757 |
| 2009/0124165 A1 | 5/2009 | Weston |
| 2009/0137323 A1 | 5/2009 | Fiegener et al. |
| 2009/0221374 A1 | 9/2009 | Yen et al. |
| 2009/0234919 A1 | 9/2009 | Jefremov et al. |
| 2010/0069148 A1 | 3/2010 | Cargill |
| 2010/0093434 A1 | 4/2010 | Rivas |
| 2010/0125028 A1 | 5/2010 | Heppert |
| 2010/0172287 A1 | 7/2010 | Krieter |
| 2010/0274902 A1 | 10/2010 | Penman et al. |
| 2010/0328319 A1 | 12/2010 | Ikenoue |
| 2011/0014842 A1 | 1/2011 | Rappaport-Rowan |
| 2011/0021109 A1 | 1/2011 | Le et al. |
| 2011/0028219 A1 | 2/2011 | Heatherly et al. |
| 2011/0124264 A1 | 5/2011 | Garbos |
| 2011/0190047 A1 | 8/2011 | Ganz |
| 2011/0213197 A1* | 9/2011 | Robertson ............ A61B 5/486 600/27 |
| 2011/0230114 A1 | 9/2011 | Du Preez et al. |
| 2011/0234756 A1 | 9/2011 | Alder et al. |
| 2011/0269365 A1 | 11/2011 | Goff et al. |
| 2011/0312418 A1 | 12/2011 | Page |
| 2012/0040763 A1 | 2/2012 | Auterio et al. |
| 2012/0094767 A1 | 4/2012 | Presgraves |
| 2012/0142429 A1* | 6/2012 | Muller .................... A63F 13/12 463/42 |
| 2012/0221418 A1* | 8/2012 | Smith .................... G06Q 30/02 705/14.67 |
| 2012/0271143 A1 | 10/2012 | Aragones et al. |
| 2013/0017891 A1 | 1/2013 | Romero et al. |
| 2013/0150155 A1 | 6/2013 | Barney et al. |
| 2013/0165234 A1 | 6/2013 | Hall et al. |
| 2013/0238392 A1 | 9/2013 | Sloan et al. |
| 2013/0257877 A1* | 10/2013 | Davis .................... A63F 13/12 345/473 |
| 2013/0288563 A1 | 10/2013 | Zheng et al. |
| 2013/0309641 A1 | 11/2013 | Sawyer et al. |
| 2014/0030955 A1 | 1/2014 | Smetanin et al. |
| 2014/0227676 A1 | 8/2014 | Noshadi et al. |
| 2015/0004584 A1 | 1/2015 | Galibois et al. |
| 2015/0077234 A1 | 3/2015 | Fullam |
| 2015/0080121 A1 | 3/2015 | Garlington et al. |
| 2015/0336016 A1 | 11/2015 | Chaturvedi |
| 2015/0375134 A1 | 12/2015 | Zhang et al. |
| 2016/0067593 A1 | 3/2016 | Yim et al. |
| 2016/0140867 A1 | 5/2016 | Aragones et al. |
| 2016/0144283 A1 | 5/2016 | Martin et al. |
| 2016/0325180 A1 | 11/2016 | Nelson et al. |

* cited by examiner

ENHANCED SYSTEM AND METHOD FOR PROVIDING A VIRTUAL SPACE

CROSS-REFERENCE TO RELATED APPLICATIONS

The present application is a continuation of U.S. patent application Ser. No. 13/725,390, entitled "ENHANCED SYSTEM AND METHOD FOR PROVIDING A VIRTUAL SPACE," filed Dec. 21, 2012, the contents of which are hereby expressly incorporated by reference in their entirety.

FIELD OF THE INVENTION

The invention relates to providing a virtual space based on personality of one or more characters in the virtual space and/or personality of a user of the virtual space.

BACKGROUND OF THE INVENTION

A virtual space may comprise a simulated space (e.g., a physical space) instanced on a computing device, such as a server, desktop computer, laptop computer or handheld device. The virtual space may have one or more characters. Some characters may be associated with one or more users of the virtual space. Such characters may be controlled by the associated users (e.g., avatars). The virtual space may also have topography (2D or 3D), expressing ongoing realtime interaction by a user, and/or include one or more objects positioned with the topography. The topography may include dimensions of the virtual space, and/or surface features of a surface or objects that are "native" to the virtual space. In some instances, the topography may describe a volume with one or more bodies positioned therein. For example, picture a virtual space that simulates an underground dungeon having a human protagonist, dark walls, obnoxious monsters, unexpected obstacles and etc. A user controlled character, or avatar is typically subject to user's control commands (e.g., user directed commands instructing his/her avatar to move around in the virtual space). A virtual space may also comprise characters not associated with any user (e.g., a character generated and controlled by artificial intelligence (hereinafter "AI character").

Characters, topography, objects within a virtual space may be presented visually through different display techniques, such as modeling, skinning, texturing, lighting, and/or other suitable display techniques. They may also be presented by accompanying audio, such as voices, sound effects, game narrations, and/or other suitable audio presentation methods. Accordingly, an instance of a virtual space (i.e., the virtual space at a particular moment) may be provided by presenting characters, topography and objects through graphics and/or audio in ways to reflect whatever the state they may be in at that moment to form the virtual space. The characters and objects may be presented based on past events and activities that have transpired within the virtual space in previous instances. As an improvement, some virtual spaces are provided adaptively such that characters and objects are presented in the virtual spaces based on certain evolving traits of characters and objects. For example, a character may be displayed within a virtual space having textures that reflect a growing age of the character—the character may be displayed with features of a younger person at early stages of a video game and with features of an older person at later stages of the game. However, in the aforementioned virtual spaces, the character's personality does not evolve and neither does the character evolve based on changes in the character's and/or user's personality. As a result, the user's interaction and level of engagement in the virtual space can decrease as the user may feel somehow detached from the virtual space.

SUMMARY

One aspect of the disclosure relates to determining a representation of a virtual space based on information defining a personality of a character within the virtual space. As described above, within a virtual space, different types of characters based on how they are controlled may exist. For example, an avatar is a type of character that may be controlled by an associated user to represent the user in the virtual space. AI characters, on the other end, may be controlled by intelligence that is configured into the virtual space, such as computer programs. One of ordinary skill in the art will recognize any other types of characters that may exist in a virtual space. In any case, a character's personality may be determined based on activities, events, missions and etc. the character has participated in within the virtual space. The personality of the character may also be determined based on information regarding a user. In some examples, the character's personality may be determined in ways that are not controlled or predicted by the user. In some other examples, the character's personality may be determined by adopting the user's personality, skills, preferences and/or other information regarding the user. In some implementations, the character's personality may be determined to provide therapeutic impact to the user or to act as a compliment to the user's personality to increase their emotional connection to the character and their engagement in the game, or facilitate their development. This may include determining a character's personality to cause growth, self-understanding, empathy, increased assertiveness, improved ability to relate to others, decreases in symptomatology such as anxiety or low mood, and/or to provide other therapeutic impacts. The personality of the character may also be customized by the user (e.g., by adjusting a set of traits reflecting the character's personality such as enthusiasm, compassion, toughness, tone of voice, and/or other suitable traits of the character that may reflect the character's personality). These adjustments could also be made simply to increase the user's interest level in the game, or for the sole purpose of entertainment.

Such adjustments to the character's personality may also be made through direct "social" interaction between the user and the character in the game. For example, the user can indicate that their character is talking too much or exhibiting too much of a certain characteristic or not enough of another (e.g., "You are being too enthusiastic.") and the character's personality would adjust accordingly (e.g., "Sony about that, I just get excited sometimes. I'll try to tone it down.").

A representation of a virtual space may be determined based on the character's personality to reflect the emotion, affective feeling, persona, and/or any other suitable personality traits of the character. Such a representation of the virtual space may involve representing the character visually and/or audibly in ways that reflect the character's personality, such as but not limited to, through the character's explicit speech, implicit qualities (e.g., speech style, speech pattern and content, gesture, and/or other implicit qualities of the user), response style, manifested physical appearances, and/or other characteristics. This may enhance the user's level of engagement with the character as the character is represented in a logical and yet unpredicted way. Changes in the character's personality may be intended to result in a specific therapeutic impact for the user. An appropriate, or desired, therapeutic impact for the user may be determined based on one or more of a determined personality (or personality characteristic) of the user, input from a caregiver or supervisor, and/or other sources. The user may also develop a relationship with the character as the user discovers the personality of the character. As a result, the user's experience in the virtual space may be enhanced.

Another aspect of the disclosure relates to providing a virtual space based on the user's personality. The virtual space may be provided in ways that are sensitive to user's affective or emotional state, persona etc. and thereby provide an enhanced experience to the user. As so provided, the virtual space may also connect users with each other in the virtual space (e.g., in real time) based on their personalities. The user's personality may be determined through various channels, such as but not limited to, user's interaction with the character, user's activities within the virtual space, user's declared information about the user's personality, input from a caregiver or supervisor, and/or other channels. The user's personality may also be determined based on information regarding user's personality and preference from any available source external to the virtual space. Such information may be analyzed through psychometric measurement to determine the user's personality. The user information that may be used to determine the user's personality may also include information regarding the user's learning style (e.g., a style that is most appropriate for user's learning according to the user's personality). For example, information regarding a learning style of the user's may be included in a user's personality profile to facilitate presentations of activities, events, suggestion and/or any other that information that involve education or other aspects of personal development or progress in the virtual space. A determination of representation of the virtual space based on the determined user's personality may involve determining a style a through which a character may interact with the user, types of activities that may be suggested to the user to partake within the virtual space, content of narrations and prompts that may be presented to the user within the virtual space.

In some implementations, a system configured to provide a virtual space based on a personality of a character and/or the user's personality within the virtual space may include one or more processors configured to execute one or more computer program modules. The one or more computer program modules may include one or more of a space module, a character module, a user module, a user development module, and/or other modules.

A space module may be configured to execute an instance of a virtual space. The space module may implement the instance of the virtual space to facilitate participation by users within the space by determining the space representation information from the instance and transmitting the space representation information to client computing platforms associated with the users or to a presentation device such as a display or speaker. The space representation information may comprise view information defining presentation of the virtual space at a particular instance. Such view information may facilitate presentation of views of the virtual space through graphics, such as but not limited to, the character's appearances (e.g., facial expression, attire and/or other appearances), response style, gesture and/or other suitable graphical information included in views of a virtual space. View information may also facilitate presentation of the space through sounds, such as but not limited to, the character's speech content, speech pattern, speech style, content of narrative prompts presented to the user, and/or other suitable sound information included in views of a virtual space. The space module may be further configured to determine an interaction through which the virtual space interacts with the user based on user's personality to cause growth, understanding, empathy, increased assertiveness, and/or to provide other therapeutic impacts to the user.

A character module may be configured to determine information regarding a character within the virtual space. Such information may include information defining personality of the character. As used herein, "personality" may refer to a dynamic and organized set of characteristics or traits possessed an entity (e.g., a user or character) that influence the manifested cognitions, motivations, and behaviors of the entity in various situations. It will be appreciated that personality should not be confused with a measurement of skill, dexterity, knowledge of one or more topics, amount of participation in the virtual space, or social status within the virtual space. The character's personality may be manifested through its physical appearances (e.g., "choice" of attire, speech content and style (e.g., the quality and quantity of statements made by a character, tone of voice, and/or other speech content and style of a character), interaction style (e.g., engaging or reserved, introvert or extravert), response style (e.g., enthusiastic reposes or lack of reposes) and/or other suitable manifested traits that may reflect the character's personality. In some examples, the personality of a character within the virtual space may be determined based on information regarding a user. A personality of the character may be determined to provide to therapeutic impacts to the user based on the user's personality. For example, the character may provide help, suggestion, and/or hints to the user to help the user work through the virtual space. The character's personality may also be updated in response to changes in user's personality as determined by the user module or other modules. In some other examples, the character's personality may also be customized by the user.

The user module may be configured to manage user accounts associated with the individual users. User accounts may include information indicating a user's personality. The user module may also be configured to determine the user's personality based on user's experiences with the virtual space. Such experiences may include activities the user has participated in within the virtual space, for example, missions participated in (or not participated in through avoidance and/or active refusal), quests or tasks accepted, quests or tasks refused or avoided, purchases, sales, trades, places visited, battles participated in and/or avoided, searches performed, and/or other activities undertaken, avoided or refueled by the user within the virtual space.

The user module may also be configured to identify the user's interaction with the virtual space that indicates user's personality. Such interaction may include user's interaction with the character, topography of the virtual space and/or another user, user's self-expression, and/or other interactions. Interaction of the user with the character may include exchanges, either verbal or text, between the user and character (e.g., statements), user's comments toward the character (e.g., user expressing "awesome" after the character completes a difficult task), user's declared information to the character and/or other interactions. Interaction of the user with the topography of the virtual space may include, for example, types of tasks and objects the user tend to engage within the virtual space. User's interaction with another user may include, for example, text chat, private messages, electronic mail, voice chat, forum posts, forum topics begun, forum topics read, non-player character conversations, content posts, content linked, and/or other suitable interaction between users within the virtual space. Self-expression of the user within the virtual space may include, for example, mentor selection, avatar customization, avatar attire and/or equipment created, purchased, and/or used, items and/or content created or modified, and/or other interactions indicating self-expression of the user within the virtual space. The user module may be further configured to detect the user's interaction that indicates the user's personality. The user module may still be configured to analyze information regarding the user through psychometric measurement to determine the user's personality. These types of user interactions may be used to learn the user's personality.

The user development module may be configured to determine information that facilitates a development of the user based on the user's personality. Such a development may be intended to improve user's experiences within the virtual space, user's confidence, emotion understanding, level of assertiveness, level of general understanding, social skills, cognitive skills, behaviors (in the virtual space and/or real life) and/or any other appropriate personal enhancements that might be associated with the user in virtual space and/or in the real life. For example, if a profile of user's personality indicates that user lacks understanding of their own or other's emotions, developmental goals to help the user understand emotions may be determined by the user development module to cause the user to develop in this area. In some implementations, the character module may be configured to determine information defining the character's personality based on the determined development information for a user. For example, the character's personality may be determined to be effusive and inclined to express emotions to facilitate the user's development in emotion understanding. The space module may be further configured to determine view information to include manifested appearances of such a character (e.g., exaggerated facial or physical expressions) to emphatically present the character's emotions to the user. The character module may also be configured to update the information defining the personality of the character in response to changes in the development information determined by the user development module such that a progressive user development may be achieved.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
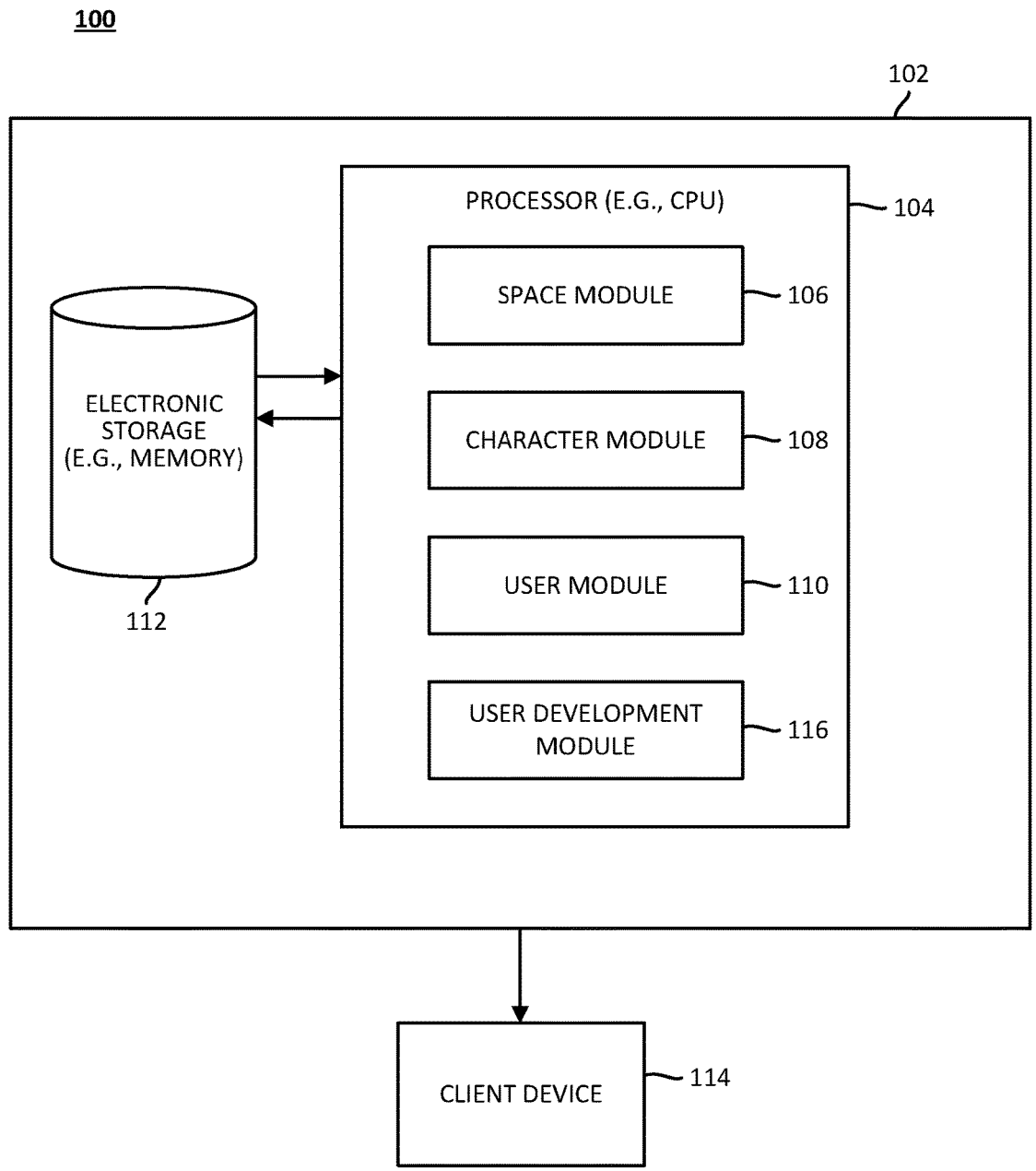
FIG. 1 a block diagram illustrating one example of a system configured to provide a virtual space based on character's personality and/or user's personality.

FIG. 1 illustrates one example of a system 100 for providing a virtual space based on a character's personality and/or a user's personality. The system 100 may determine a representation of a virtual space based on information defining a personality of a character and/or information indicating the user's personality. To facilitate such a determination, the system 100 may manage the information defining personality of one or more characters and as well as the information indicating one or more users' personality. As such, the system 100 may provide a more user-friendly and engaging virtual space, which may provide therapeutic impacts to the user, may be more enjoyable to the user, and/or provide other enhancements with respect to conventional virtual space providing system in which representations of a virtual space are not determined based on personality information regarding characters and/or users within the virtual space.

In some implementations, system 100 may employ a client/server architecture that includes one or more of a server 102 and/or other components. The server 102 may comprise electronic storage 112, one or more processors 104, and/or other suitable components. In those implementations, server 102 may also include communication lines, or ports to enable the exchange of information with a network and/or other computing platforms. The processor 104 may be configured to execute computer program modules. The processors 104 may be configured to execute the computer program modules via one or more of hardware, software, and/or firmware. The computer program modules may include a space module 106, character module 108, user module 110, a user development module 116, and/or other computer program modules. Although one server 102 is illustrated, it is understood that the number of servers 102 included in system 100 may vary in some other examples. In those examples, the space module 106, character module 108, user module 110, user development module 116 may be distributed on the same and/or different servers 102. Users may interface with system 100 via client device 114 through one or more electronic communication links. For example, such electronic communication links may be established, at least in part, via a network such as the Internet and/or any other suitable wired or wireless communication links in the art. In those embodiments, the client device 114 may include one or more processors configured to execute computer program modules. The computer program modules may be configured to enable one or more users associated with the given client computing platform to interface with system 100, and/or provide other functionality attributed herein to client device 114. By way of non-limiting example, the given client computing platform 114 may include one or more of a desktop computer, a laptop computer, a handheld computer, a NetBook, a Smartphone, and/or other computing platforms.

In some other implementations, system 100 may be, for example, a laptop computer, desktop computer, media center, handheld device (e.g., mobile or smart phone, tablet, etc.), gaming console, set top box, printer or any other suitable device, to name a few. In those embodiments, the system 100 may employ one or more computing devices 102. The computing device 102 may comprise one or more processors 104, operatively connected to one or more of electronic storage 112 via any suitable wired or wireless connection. Any other suitable structure, such as but not limited to input devices, graphics processing unit (GPU), or memory may also be included in the system 100 in those implementations. In those implementations, the client device 114 may include any suitable display device. The computing device 102 may be connected to client display device 114 via a connector, such as analog display connectors, for example, composite video, S-Video, VGA, digital display connectors, for example, HDMI, mini-DVI, micro-DVI, wireless connectors or any other suitable connectors. In those embodiments, the client device 114 may also include any suitable sound device, such as a speaker.

As shown in this example, the processor 104 may be a host central unit (CPU) having multiple cores however any suitable processor may be employed including a DSP, APU, GPGPU or any other suitable processor or logical circuitry. It is understood that although only one processor 104 is illustrated in this example, the number of processor 104 may vary in some other examples. As shown in this example, the processor 104 may be configured to execute one or more computer program modules. The one or more computer program modules may include one or more of the space module 106, the character module 108, the user module 110, the user development module 116, and/or other computer modules.

It should be appreciated that although modules 106, 108, 110, and 116 are illustrated in FIG. 1 as being co-located within a single processing unit, in implementations in which processor 104 includes multiple processing units, one or more of modules 106, 108, 110 and/or 116 may be located remotely from the other modules. In implementations in which a plurality of devices 102 operates in a coordinated manner to provide the functionality described herein with respect to processor 104, some or all of the functionality attributed to one or more of 106, 108, 110, and/or 116 may be provided by the modules executed on processors 104 of the plurality of devices 102. The description of the functionality provided by the different modules 106, 108, 110, and/or 116 described below is for illustrative purposes, and is not intended to be limiting, as any of modules 106, 108, 110, and/or 116 may provide more or less functionality than is described. For example, one or more of modules 106, 108, 110, and/or 116 may be eliminated, and some or all of its functionality may be provided by other ones of modules 106, 108, and/or 110. As another example, processor 104 may be configured to execute one or more additional modules that may perform some or all of the functionality attributed below to one of modules 106, 108, 110, and/or 116.

The space module 106 may be configured to implement an instance of the virtual space executed by the processor 104 to determine representation information defining representations of the virtual space. A virtual space may comprise a simulated space (e.g., a physical space) instanced on a computing device and/or server (e.g., device 102) that is accessible by a client (e.g., client device 114). The simulated space may include a topography, express ongoing real-time interaction by the user, one or more AI characters, and/or one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

As described above, within a virtual space, different types of characters based on how they are controlled may exist. For example, an avatar is a type of character that may be controlled by an associated user to represent the user in the virtual space. AI characters, on the other end, may be controlled by intelligence that is configured into the virtual space, such as computer programs. One of ordinary skill in the art will recognize any other types of characters that may exist in a virtual space. Avatars associated with the users may be controlled by the users to interact with each other, with AI characters, with the topography of the virtual space and/or other objects of the virtual space. As used herein, the term "avatar" may refer to an object (or group of objects) present in the virtual space that represents an individual user. The avatar may be controlled by the user with which it is associated. The avatars may interact with each other by physical interaction within the instanced virtual space, through text chat, through voice chat, and/or through other interactions. The avatar associated with a given user may be created and/or customized by the given user. In some cases, the avatar may adopt a personality of the user. However, in some other cases, the avatar may have a personality that is different from that of the user. As used herein, "personality" may refer to a dynamic and organized set of characteristics or traits possessed by the character or user of virtual space and influencing the cognitions, motivations, and behaviors of the user or character in various situations. It will be appreciated that personality should not be confused with a measurement of skill, dexterity, knowledge of one or more topics, amount of participation in one or more virtual environments, or social status within one or more virtual environments.

Unlike avatars associated with users, AI characters within a virtual space may not be associated with any user. As such AI characters may be generated and/or developed through artificial intelligence provided by device 102. AI characters may also evolve within the virtual space free from user's control. AI characters may interact with avatars associated with users, with other AI characters and as well as the topography of the virtual space. Certain manifested traits may be associated with AI characters, for example, physical appearances such as age, attire, facial expression, speech style and pattern, response style in reaction to user's interaction or other AI characters' interaction, gesture and/or any other traits. Like avatars, AI characters may also possess personalities of their own. A personality of an AI character may also influence the AI character's behavior, appearances, and etc. in the virtual space.

Representation information of a virtual space may include view information that facilitates graphical representation of characters (e.g., avatars or AI characters). The representation information of the virtual space may also include sound information that facilitates representing the characters through audio. Space module 106 may determine a representation of virtual space by determining the view and/or sound information about characters to reflect the characters' personality. For example, when presenting a character through speech (e.g., enabling the characters to make an explicit statement), space module 106 may determine the content of the character's speech to reflect the character's personality. Such content may include express description about the character's personality (e.g., "I am outgoing", "I am moody", etc.), statements that implies a quality of character implicating the character's personality (e.g., character's exclamation of "This is awesome" or "What's next" after completing a difficult task may imply a level of excitability and effusiveness about the character), and/or any other suitable speech content that may implicate the character's personality. Space module 106 may also determine a response style a character may employ in reaction an event, interactions from a user (e.g., through an avatar). Effusive responses by the character may reflect a caring or engaging personality of the character. On the other hand, lack of response by the character may reflect a self-centered or indifferent personality of the character. For example, an avatar having a self-centered personality (however, such a personality of the avatar may not necessarily be the personality of the user associated with the avatar) may be determined to scream as a response to a user's expression of feeling scared (e.g., the user may convey such a feeling to the avatar through a declared statement). Conversely, an avatar having an affective personality may be determined to express empathy such as "You're Okay?" in response to the declared scared feeling of the user. In some implementations, the personality of avatar may be visually represented, for example, graphical representation of the character's emotional state using lights on arms for excitement or sadness.

Space module 106 may also determine view information about the character to reflect the character's personality. For example, the view information about the character may include the character's facial expression, body language, style of movements, attire, and etc. A character movement's strength and posture may be determined to convey a level of confidence possessed by the character. An embarrassed look (e.g., flush cheek) or fearful look on the character's face may convey a level of self-consciousness or anxiety possessed by the character. The length of such expressions of the character may also convey the depth or persistence of the feeling that reflects the character's personality. It is understood that the above-mentioned examples of providing a virtual space by determining a representation of virtual space that includes characters in ways reflecting character's personality are described for the purposes of exemplary description only and not as limitations. A representation of virtual space may include any other suitable representation of a character to reflect the character's personality within a virtual space and will be appreciated by those having ordinary skills in the art.

Representation information of a virtual space may also include information that facilitates the virtual space to interact with the user. A virtual space may initiate an interaction with a user through, for example, visual and/or audio prompts including arrows suggesting to the user that s/he should explore certain topography within the virtual space, texts helping the user navigate the virtual space, narrative or graphical dialogues mentoring the user to develop his/her experiences, skills, and etc. within the virtual space, dialogues providing certain information to the user such as cool products, places, music, movies and/or any other suitable suggestions that the user might be interested in real life, and/or any other suitable visual and/or audio prompts to interact with a user in a virtual space. A virtual space may also initiate an interaction with a user through a character. For example, a character (e.g., an avatar or AI character) may interact with the user in response to the user's actions within the virtual space. For instance, a character may express empathy to the user when the user is unsuccessful in completing certain tasks within the virtual space. The character may comment on the user's success or failure in achieving certain events, goals, skill levels, obstacles and/or any other activities in the virtual space. The character may also mentor the user to develop within the virtual space to develop (e.g., experiences, skills, tastes, and/or other traits).

In some embodiments in accordance with the disclosure, the space module 106 may be configured to determine interactions the virtual space may have with the user based on information indicating the user's personality. Such interactions may be determined to provide growth, understanding, empathy, increased assertiveness, and/or other therapeutic impacts to the user. For example, they may include comments on user's activities, mentoring facilitating user's development, suggestions of experiences the user may engage in and/or any other suitable mentoring. Such interactions may be provided to the user by the virtual space through, for example, graphical dialogues, narrations, character's statements, character's movements, sound and/or visual effects, and/or other suitable communication means between the virtual space and user.

For example, to facilitate an interaction with the user, the space module 106 may determine an interaction style through which a character may interact with the user. For instance, the space module 106 may determine the character, when interacting with the user after the user completes a task or skill level, to make a strong comment, such as "Great job!", "Super, that was scary but you made it!" and the like to improve confidence or assertiveness of the user. This may provide the user an enjoyable and therapeutic engagement with the virtual space that is attuned to the user's personality.

The space module 106 may also determine mentoring provided to a user based on the user's personality and/or developmental goals customized for the user's development. For example, a user who engages in only information gathering or intellectual tasks within the virtual space will be at first gently encouraged to try some social or athletic tasks, then gradually more urgently and enthusiastically encouraged if they begin to acquire a taste for, or respond to certain kinds of affectively-loaded prompts. In another example, the user's personality profile may be in the category of an action-oriented extrovert and the user may thus be mentored in an enthusiastic, direct manner. In some other examples, the space module 106 may determine to push types of missions against the user's personality profile so to develop the user and help the user to grow the user's, for example, cognitive skills, social skills, confidence, assertiveness, and/or any other suitable skills.

The space module 106 may also determine suggestions of experiences the user may engage in, in the virtual space or in the real life, based on the user's personality. For example, the space module 106 may determine to suggest social events a user may engage in the virtual space if the user's personality profile indicates the user may need growth in social skills. In some examples, the space module 106, based on the user's personality, may also determine to push out suggestions about certain commercial products, real life cultural experiences such as TV shows, movies, concerts, real life sceneries and/or any other suitable real life activities for the user to help the user to develop his/her, for example, cognitive skills, social skills, confidence, assertiveness, and/or any other personal enhancements in real life.

The space module 106 may be configured to provide representational information to facilitate user connections within the virtual space based on the users' personalities. For example, suggestions may be provided through a character within the virtual space to a user, suggesting that the user may connect with another user in the virtual space who might share a similar personality with the user. Such suggestions may include information indicating how to connect with other users within the virtual space in real time, in real life and/or any other suitable ways for the users to connect with each other.

The character module 108 may be configured to determine information regarding the character that may be used by the space module 106 in determining representation information about the virtual space as described above. As described above, within a virtual space, different types of characters based on how they are controlled may exist. For example, an avatar is a type of character that may be controlled by an associated user to represent the user in the virtual space. AI characters, on the other end, may be controlled by intelligence that is configured into the virtual space, such as computer programs. One of ordinary skill in the art will recognize any other types of characters that may exist in a virtual space. In any case, information regarding a character may include a set of one or more traits associated with the character, such as but not limited to the character's name, age, gender, size, skin color, physical features (e.g., body and/or facial), physical abilities, skill levels, tastes, and/or any other suitable character traits. Information regarding the character may also include information defining the character's personality, which may be used by the space module 106 to determine a representation of the virtual space as described above. Information defining the character's personality may also be managed and stored in forms of personality models that include social, emotional, educational (e.g., knowledge), athletic dimensions and/or any other suitable dimensions describing the character's personality, interactive matrixes consisting of graphical modules and/or dialog modules, and/or any other suitable form.

In some embodiments in accordance with the disclosure, the character module 108 may be further configured to determine information defining personality of the character based on a determined personality of a user. For example, an avatar (e.g., a virtual space character that is controlled by a user) may adopt some of the personality of the associated user based on information regarding the user. Information regarding the user may include the user's skill level, preferences, tastes (e.g., user's tendencies to engage in certain type of tasks or events in the virtual space or in the real life), historical records (e.g., events, real life events and life story information, missions, and/or tasks a user has completed in the virtual space or in the real world), and/or any other suitable user information, relating to user's experience in the virtual space and/or in the real life, that may be used to determine the character's personality. In some examples, the character's personality may be determined such that the character will facilitate user's engagement, entertainment, or participation in the virtual space, for example, by adopting the user's personality or someone the user might like to increase the rapport between character and user or to amuse the user. In some other examples, the character's personality may be determined to cause growth, understanding, empathy, increased assertiveness, and/or to provide other therapeutic impacts to the user.

In some implementations, the character module 108 may be further configured to update the information defining the personality of the character in response to one or more changes in the user's personality as determined by, for example, the user module 110. In those implementations, as so configured, the character module 108 may enable a character in the virtual space to "learn" about a user and evolve the character's personality based on the learned information about the user. For example, the character module 108 may update information defining a personality of an avatar associated with a user after the user accomplishes a mission that would have been scary, difficult and/or new for the avatar's personality prior to the user accomplishing the mission. In that example, the avatar's personality is adapted to the user's experiences within the virtual space. This may develop the avatar's personality according to the associated user's experiences in the virtual space. However, in another example, a character's personality, to the contrary, may be adapted according to the learned information regarding the user such that it may provide a challenge or to cause growth, understanding, empathy, increased assertiveness, and/or to provide other therapeutic impacts to the user.

In some implementations, the character module 108 may be configured to employ a personality of the character to develop the character. For example, the character's personality may be used to facilitate the character's cognitive, intellectual, academic developments and/or any other appropriate development for a character within a virtual space. As so developed, the character may evolve in the virtual space organically in a logical and yet unpredicted way to the user.

In some embodiments in accordance with the disclosure, the character module 108 may be further configured to determine information defining the character's personality based on the user's selection of the character's personality. For example, the character module may provide dialogue modules, such as dials, bars and etc., for a user to customize personality of a character. The user may customize the character's personality to adopt some of the user's personality so that the character (e.g., an avatar associated with the user) may be visually and/or audibly represented by the space module 106 to reflect the user's personality. This may be helpful in a virtual space where multiple users engage with each other through avatars, such as but not limited to a virtual environment for social connections or multi-player game world. In some other examples, the user may also, through the character module 108, customize an AI character's personality such that it may provide challenges, excitements, empathy, encouragements, and/or other interactions with the user and/or other characters.

The user module 110 may be configured to manage a user account associated with a user of the virtual space. In some implementations, the user module 110 may also be configured to determine a user's personality based on information regarding the user. The user's personality determined by the user module 110 may represent a set of personality traits or characteristics included in the user's personality. For example, the personality traits or characteristics may include one or more of the personality factors described by Raymond Cattell (e.g., warmth, reasoning, emotional stability, dominance, liveliness, rule-consciousness, social boldness, sensitivity, vigilance, abstractedness, privateness, apprehension, openness to change, self-reliance, perfectionism, tension, and/or other factors) in "The description and measurement of personality", New York: Harcourt, Brace, & Wold, 1945, which is incorporated herein by reference in its entirety. As an example, the personality traits or characteristics may include one or more of the dimensions in the five dimension personality model proposed by Lewis Goldberg (e.g., openness to experience, conscientiousness, extraversion, agreeableness, neuroticism, and/or other personality traits) in "The structure of phenotypic personality traits", American Psychologist, vol. 48, pp. 26-34, 1993, which is incorporated by reference into this disclosure in its entirety.

The user's personality determined by the user module 110 may also represent a set of one or more personality archetypes present in the user's personality. For example, the set of one or more personality archetypes may include the personality archetypes defined by the Briggs-Myers Personality Test. As an example, the set of one or more personality archetypes may include one or more personality archetypes included in the Enneagram of Personality (e.g., the Reformer, the Helper, the Achiever, the Individualist, the Investigator, the Loyalist, the Enthusiast, the Challenger, the Peacemaker, and/or other personality archetypes).

Other personality models including a set of traits, characteristics, and/or archetypes may be determined by the user module 110. For example, the user module 110 may determine a user's personality based on the Chakras (e.g., Crown, Third Eye, Throat, Heart, Solar Plexus, Sacral, Base, and/or other chakras). Other examples of suitable personality models that may be determined and used by the user module 110 will be appreciated by one of ordinary skill.

In some implementations, the user module 110 may be further configured to determine the user's personality based on information indicating the user's experiences within the virtual space. Information indicating user's experiences within the virtual space may include information regarding events, tasks, missions, quests and/or other activities the user has completed, information regarding currencies, health, skill levels, tastes, preferences, morale and/or other objects associated with the user in the virtual space, user declared information regarding the user's affection state, emotion, and/or mood within the virtual space, and/or any other suitable information regarding the user's experiences in the virtual space. For example, a user's tendency to engage in exciting and thrilling events, quests, tasks, missions, and/or other activities may indicate that the user's personality is in the category of active, outgoing and extrovert. On the other hand, the user's tendency to engage in social connections with other users within the virtual space may indicate the user's personality is in the category of engaging, social and extrovert. The user module 110 may acquire such information regarding user's experiences within the virtual space and determine the user's personality.

In some embodiments in accordance with the disclosure, the user module 110 may be further configured to determine a user's personality based on user's interaction with the virtual space that indicates the user's personality. User's interaction with the virtual space may include the user's explicit statements (e.g., through text or voice) to the character (e.g., avatar or AI character), the user's control commands issued to the avatar associated with the user (e.g., avoiding virtual space topography crowded with other avatars or AI characters), the user's selection, customization, preferences within the virtual space. For example, the user module 110 may determine the user's personality may be in a category of self-centered, reserved and introvert if the user rarely responds enthusiastically to the character's encouragement, a reward for completion of difficult task or quest. The user module 110 may determine that the user's personality may be socially anxious or avoidant if the user tends to instruct the avatar associated with the user to avoid crowded area within the virtual space. The user module 110 may also determine the user's personality based on the user's customization (e.g., of the avatar's personality).

In still some other embodiments in accordance with the disclosure, the user module 110 may be further configured to analyze information regarding the user using psychometric measurement to determine the user's personality. For example, information regarding a user may be acquired by the user module 110. The user module 110 may operationalize the information regarding the user through traditional psychometric personality inventories (like the MMPI, Briggs-Meyers, "projective tests" like the Rorschach and others) and/or any other suitable means. Both traditional and non-traditional diagnostic categories and dimensions may be used to capture a user's level of social, emotional, educational, and cognitive development. In some examples, the user module 110 may acquire such user information through multiple avenues via gameplay and/or direct questionnaire, survey about interests and feeling states to the user, in addition to input from other users, team members, or friends.

In yet some other embodiments in accordance with the disclosure, the user module 110 may be further configured to determine a user's personality based on information indicating the user's personality and/or preferences from a source external to the virtual space. For example such an "external" source may include another virtual space, websites related to the virtual space (e.g., public or private forums for sharing user's experience within the virtual space), social network of Facebook™, MySpace, Twitter, microblogs, and/or any other suitable sources that may provide information indicating a user's personality and/or preferences. Based on information indicating the user's personality and/or preferences from a source external to the virtual space, the user module 110 may determine, attune, customize, and/or update the information indicating the user's personality within the virtual space. In a sense, the user module 110 may import a personality of the user from a platform external to the virtual space. This may provide a convenient way for a user to establish his/her personality in the virtual space.

The user development 116 module may be configured to determine information that facilitates a development of the user based on the user's personality. Such a development may be intended to improve user's experiences within the virtual space, user's confidence, emotion understanding, level of assertiveness, level of general understanding, social skills, cognitive skills, behaviors (in the virtual space and/or real life) and/or any other appropriate personal enhancements that might be associated with the user in virtual space and/or in the real life. For example, the user development module 116 may determine a progressive development goal for the user to achieve based on the user's personality. If the user's personality profile indicates the user may have a shy personality, the user development module may determine that less aggressive tasks or events for the user to participate in within the virtual space until the user's personality profile has grown and indicate the user is ready for more challenging tasks or events. There may also be direct verbal and nonverbal communications from the virtual space or character to the user that are intended to be helpful. For example, such communications may be intended to ease their anxiety to allow them to progress in the virtual space or the real life.

In some examples, the user development module 116 may be configured to determine development information for the user to provide therapeutic impacts to the user. This may include determining a character's personality to cause growth, understanding, empathy, increased assertiveness, and/or to provide other therapeutic impacts. For example, if a profile of user's personality indicates that user lacks emotional understandings, developmental goals to help the user understand emotions may be determined by the user development module 116 to cause the user to develop in this area. In some implementations, the character module 108 may be configured to determine information defining the character's personality based on the determined development information for the user. In that example, accordingly, the character's personality may be determined to be effusive and inclined to express emotions to facilitate the user's development in understanding their own and others' emotional lives. The space module 106 may be configured to determine view information to include manifested appearances of such a character (e.g., exaggerated facial or physical expressions), to emphatically present the character's emotions to the user. In some implementations, the user development module 116 may determine the user's developments in multiple areas and/or domains and/or may organize such developments in stages. The user's developments may be assessed across all of these areas, domains, and/or stages. Based on the assessment, a determination of character style may be developed, for example, for interacting with the user and suggesting missions to the user.

The character 108 module may also be configured to update the information defining the personality of the character in response to changes in the development information determined by the user development module 116. For example, the user development module 116 may determine that a new development that is different from a previous development based on the user's personality determined by the user module 110 as described above. In response to such changes in development information for the user, the character module 108 may determine a different personality of the character to facilitate the development of the user based on the new development information determined by the user development module 116.

Electronic storage 112 may comprise electronic storage media that electronically stores information. The electronic storage media of electronic storage 112 may include one or both of system storage that is provided integrally (i.e., substantially non-removable) with system 100 and/or removable storage that is removably connectable to system 100 via, for example, a port (e.g., a USB port, a FireWire port, etc.) or a drive (e.g., a disk drive, etc.). Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may store software algorithms, information determined by processor 104, information received from system 100, information received from client device 114, information, and/or other information that enables system 100 to function properly.

Figure 2:
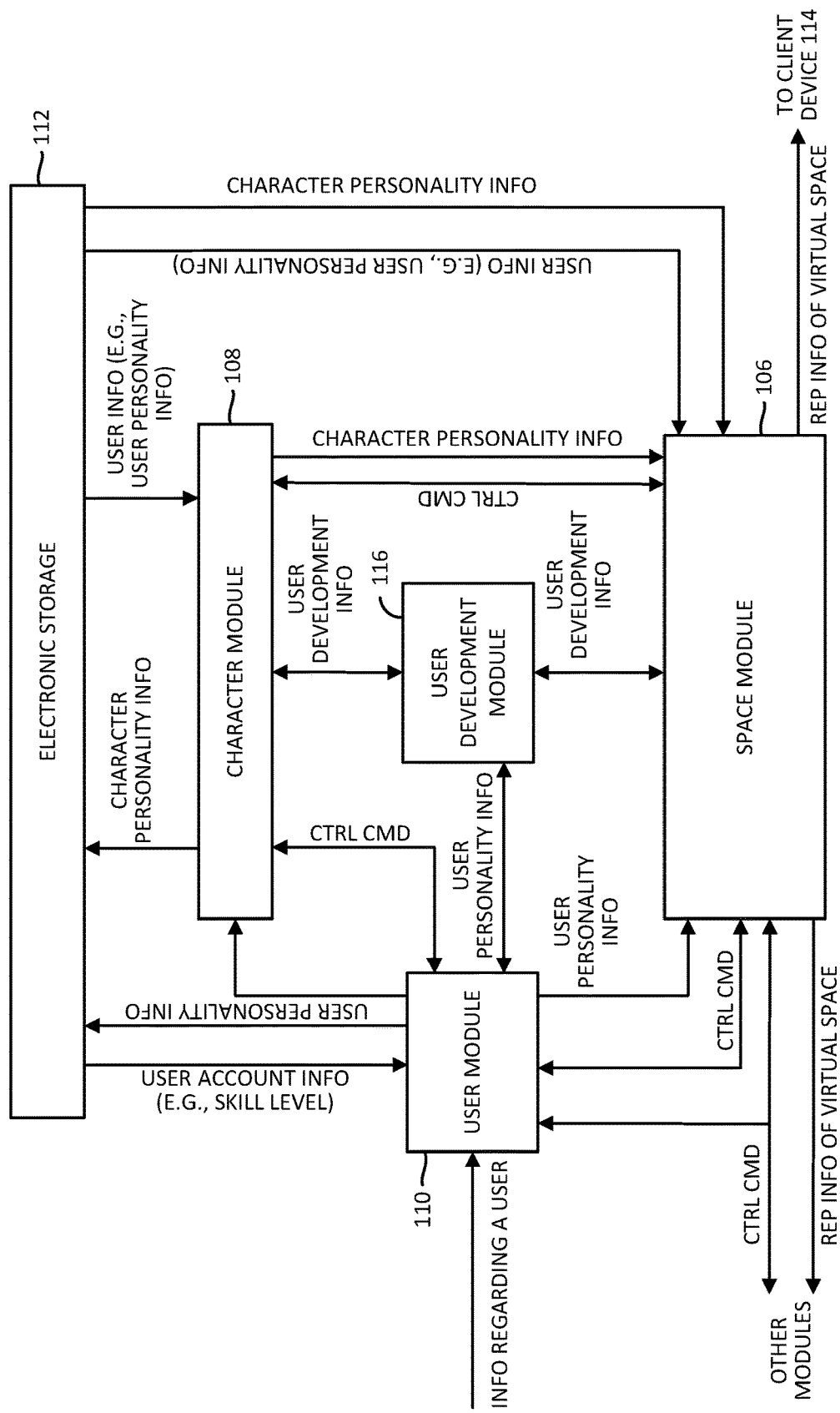
FIG. 2 is a block diagram further illustrating the system for providing a virtual space as shown in FIG. 1.

FIG. 2 is a block diagram further illustrating the system for providing a virtual space as shown in FIG. 1. As shown, the user module 110 may be configured to acquire information regarding a user within the virtual space. As described above, information regarding the user may include information indicating user's personality, activities, traits such as skill levels, tastes, preferences, achievements, currencies, and any other suitable information that may be acquired and managed based on user's experiences within the virtual space. The user module 110 may be configured to acquire such user information from other modules of system 100 (e.g., a user information gathering module, electronic storage 112, and/or any suitable input devices (not shown) such as but not limited to keyboard, microphone, motion sensor, and/or any other suitable input devices). The information regarding user may also be acquired by the user module 110 from sources external to the virtual space, such as another virtual space, websites related to the virtual space (e.g., public or private forums for sharing user's experience within the virtual space), social network of Facebook™, MySpace, Twitter, microblogs, and/or any other suitable sources that may provide information indicating a user's personality and/or preferences as described above. As also shown the user module 110 may also be configured to receive control commands from other modules of system 100 (e.g., commands to acquire information regarding a user from the user module 110).

As described above and shown in this example, the user module 110 may be configured to determine the user's personality based on information indicating the user's personality. As shown, the information indicating a personality of the user may be stored in electronic storage 112, such as but not limited to in the form of personality models transcribed to a file, memory sections in electronic storage 112, etc.

Also shown in this example is the character module 108, operatively connected to the user module 110, the user development module 116, electronic storage 112, and space module 106 through any suitable wired or wireless link or links. As described above, the character module 108 may be configured to determine and manage information regarding the character, wherein such information may comprise information defining personality of the character. As shown, the character module 108 may be configured to receive information regarding a user from electronic storage 112 (e.g. the information transcribed to a file or memory storage by the user module 110). The character module 108 may also be configured to receive information defining a personality of the user directly from the user module 110. As also shown in this example, the character module 108 may be configured to determine and/or update information defining personality of a character based on information regarding the user as described above. For example, the character module 108 may be configured to transcribe the information defining the personality of the character to a file or memory sections residing on electronic storage 112.

Also shown in this example is the user development module 116, operatively connected to the user module 110, the character module 108 and the space module 106. In this example, the user development module 116 is configured to acquire user personality information from the user module 110. Based on the acquired user personality information, the user development module 116 may be further configured to determine information that facilitates a development of the user as described above. As shown, the character module 108 may be configured to receive the user development information from the user development module 116 to determine a personality of a character to facilitate the development of the user as described above. Also as shown in this example, the user development information may also be provided to space module 106 by the user development module 116 to facilitate, for example, interactions, mentoring, prompting and/or other suitable actions provided to the user by the space module 106.

Still shown in this example is the space module 106, operatively connected to the user module 110, the character module 108, the user development module 116 and electronic storage 112 through any suitable wired or wireless link or links. The space module 106 may be configured to provide a virtual space by executing an instance of the virtual space, and implementing the instance of the virtual space to determine representations of the virtual space. As shown in this example, the space module 106 may be configured to receive information defining a character from the character module 108 as well as from electronic storage 112. The space module 106 may also be configured to receive information describing a user's personality from the user module 110 and electronic storage 112. As also shown in this example, the space module 106 in this example may be configured to determine a representation of the virtual space based on information defining a personality of a character within the virtual space and/or information indicating a user's personality as described above. The representation information determined by the space module 106 may be sent to the client device 114 or other modules of system 100 for further processing.

Figure 3:
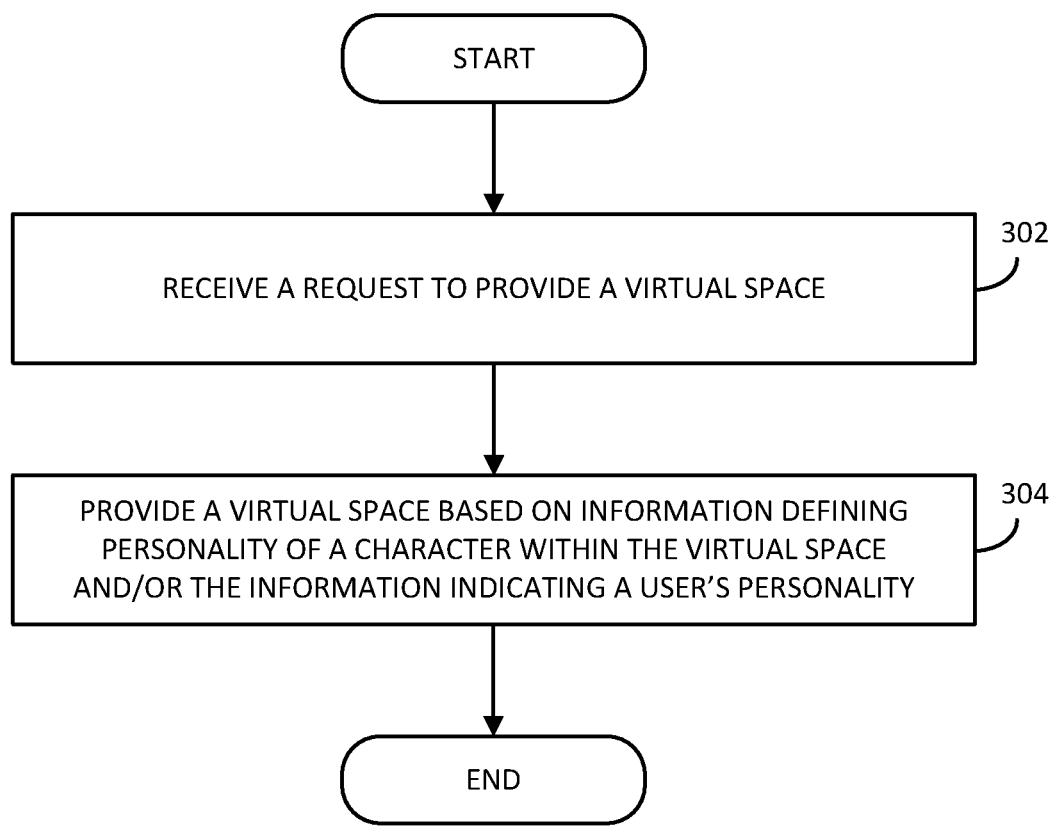
FIG. 3 is a flowchart illustrating one example of method for providing a virtual space based on character's personality and/or user's personality.

FIG. 3 is a flowchart illustrating one example of method for providing a virtual space based on character's personality and/or user's personality. It will be described with references to FIGS. 1-2. In operation, at block 302, the method receives a request to provide a virtual space (e.g., at the space module 106). For example, in a client/server architecture as described above, a client device 114 may initiate a request to the system 100 (e.g., a server) for a representation of virtual space to be presented or processed on the client device 114. In some implementations, the system 100 as shown in FIG. 1 may be a laptop, desktop, game console, and/or any other suitable device, and the client device 114 may be a display and/or audio system connected to or included in the system 100. In those implementations, other modules of the system 100 (e.g., a graphics processing module, a sound processing module, etc.) may initiate the request (e.g. via control commands as shown in FIG. 2), instructing the space module 106 to provide representation information of the virtual space.

At block 304, in operation, the method provides a virtual space based on information defining personality of a character within the virtual space and/or the information describing a user's personality. Further details of one example of operation described in block 304 are described in FIG. 4.

Figure 4:
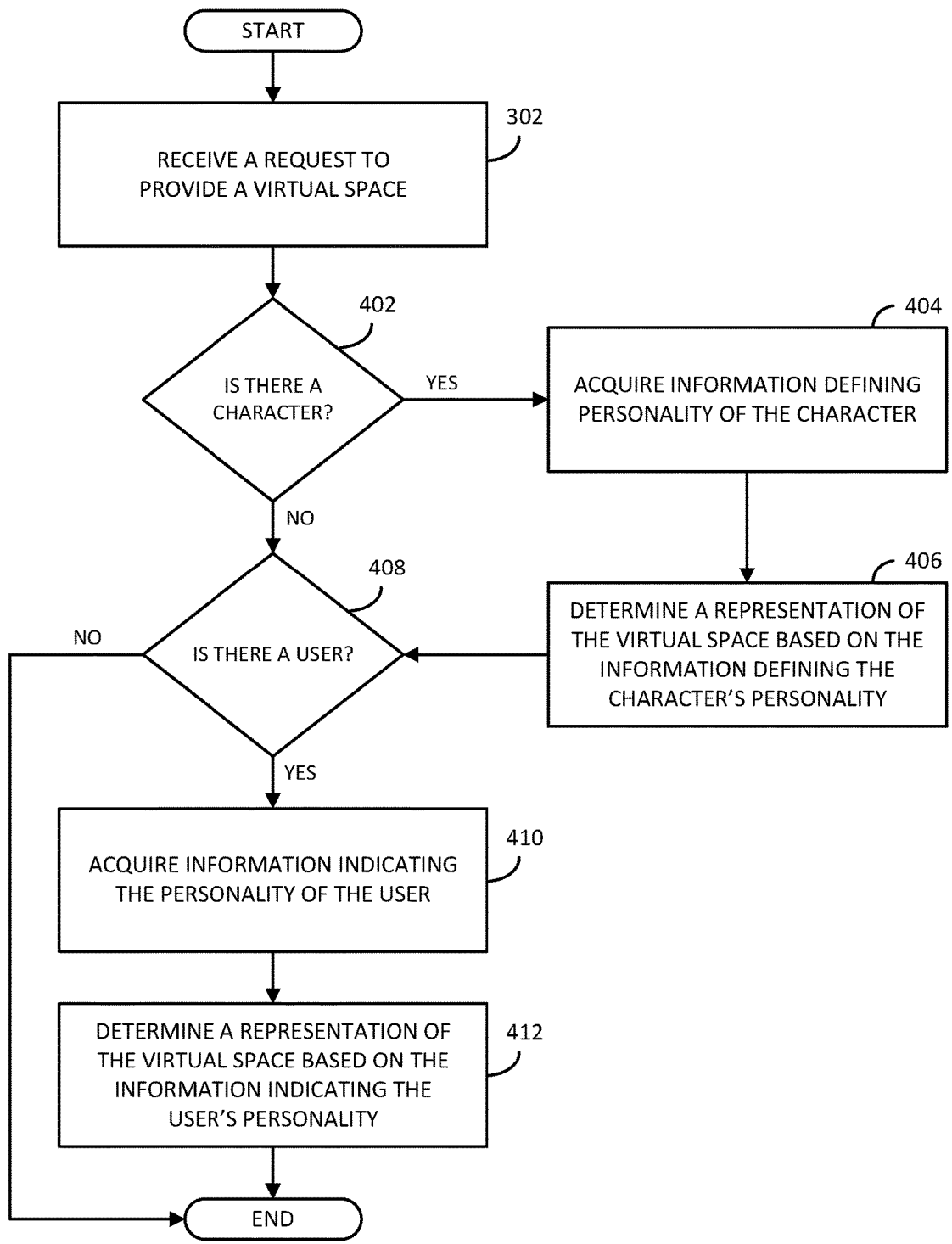
FIG. 4 is a flowchart illustrating another example of a method for providing a virtual space based on character's personality and/or user's personality.

FIG. 4 is a flowchart illustrating another example of a method for providing a virtual space based on character's personality and/or user's personality as shown in FIG. 3. It will be described with references to FIGS. 1-3. As shown, at block 302 in operation, the space module 106 receives a request to provide a virtual space. At decision block 402, in operation, the space module 106 determines whether there is a character in the virtual space. In some implementations, such as but not limited to, game worlds, virtual social spaces, and/or blog spaces, the virtual space may comprise one or more characters as described above. In those implementations, the space module 106 recognizes that there is at least one character in the virtual space and proceeds to block 404. In some implementations, a virtual space, such as but not limited to a virtual training program for pilots, drivers, astronauts, etc., may not comprise a character. In those implementations, the space module 106 recognizes that there is no character within the virtual space and proceeds to decision block 408.

At block 404, in operation, the space module 106 acquires information defining a personality of the character. For example, as shown in FIG. 2, the space module 106 may acquire such information via control commands from the character module 108. The space module 106 may also acquire the information defining the character from electronic storage 112. At block 406, in operation, the space module 106 determines a representation of the virtual space based on the information defining a character's personality as described above and proceeds to decision block 408.

At decision block 408, the space module 106 determines whether there is a user within the virtual space. In some implementations, the virtual space may not have a given user associated with the virtual space, for example but not limited to, a virtual educational program providing a virtual class wherein there is only a character as a virtual teacher. In those implementations, the space module 106 recognizes the virtual space is not associated with any identified user and proceeds to the end of the processing as illustrated. In some other implementations as described above, there are users associated with the virtual space (e.g., via avatars), and their information may be stored and managed by the user module 110. In those implementations, the method recognizes there is at least one user within the virtual space and proceeds to block 410.

At block 410, the space module 106 acquires information indicating personality of the user as described above. For example, as illustrated in FIG. 2, the space module 106 may acquire such information from the user module 110 and/or the user development module 116 via control commands. The space module 106 may also acquire such information from the electronic storage 112. At block 412, in operation, the space module 106 determines a representation of the virtual space based on the information indicating the user's personality as described above.

It is understood, the ordering of operations shown in FIG. 4 may vary in some other examples. For example, blocks 408, 410, 412 may be processed prior to or in parallel with the processing of blocks 402, 404 and 406. One of ordinary skill in the art will recognize any other suitable ordering of operations described in FIG. 4.

Figure 5:
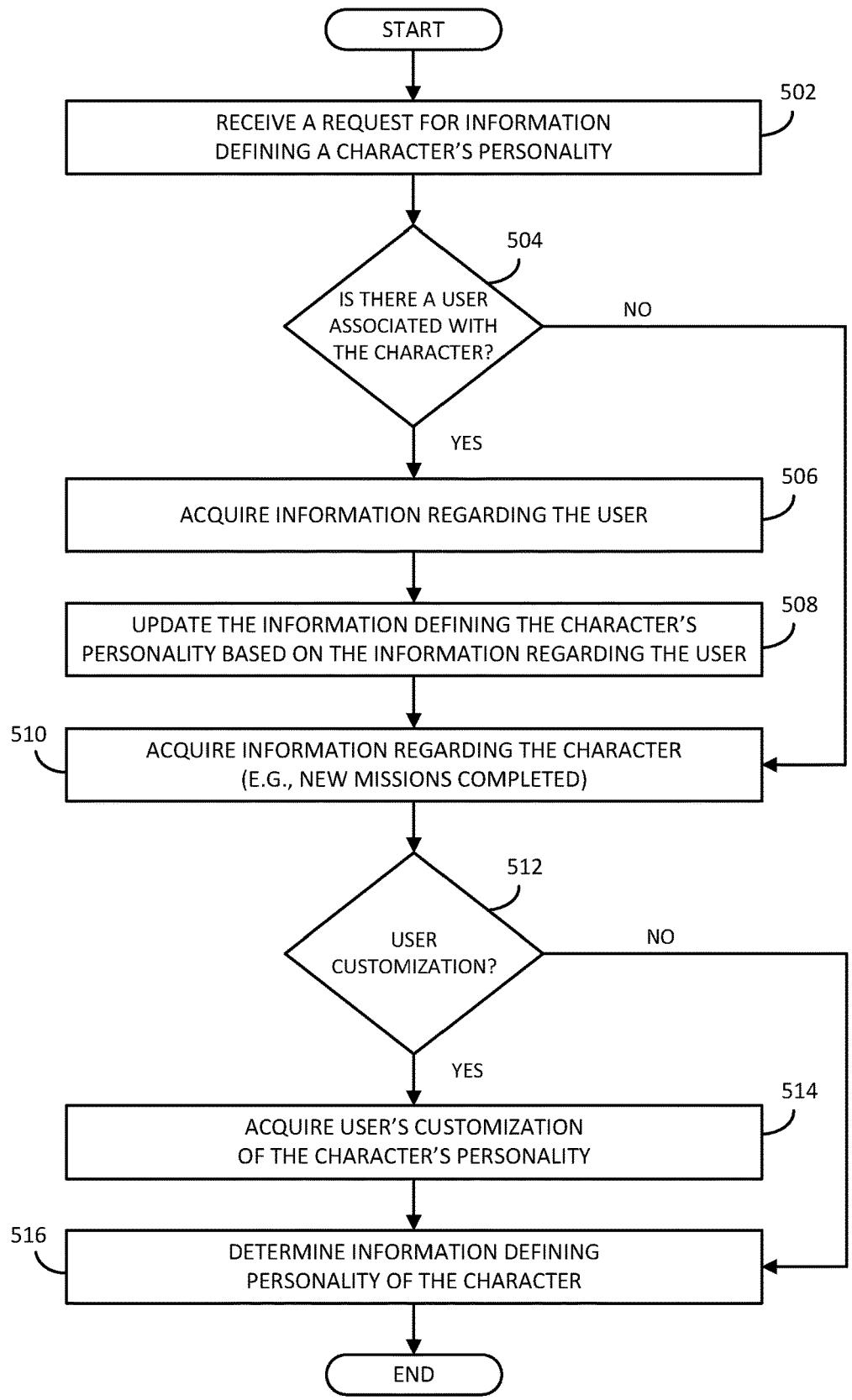
FIG. 5 is a flowchart illustrating one example of a method for determining information defining a personality of a character.

FIG. 5 is a flowchart illustrating one example of a method for determining information defining a personality of a character. It will be described with references to FIGS. 1-2. In operation, at block 502, the method receives a request for information defining a character's personality (e.g., at the character module 108). For example, such a request may be initiated by the space module 106 when determining a representation for the virtual space. At decision block 504, in operation, the character module 108 determines whether there is a user associated with the character. As described above, some characters within a virtual space may be associated with users, for example, avatars. In those examples, the character module 108 recognizes that there is a user associated with the character and proceeds to block 506. However, some other characters, such as AI characters, may not be associated with any users. In those examples, the character module 108 proceeds to block 510.

At block 506, in operation, the character module 108 acquires information regarding the associated user (e.g., from user module 110 via control commands, the user development module 116, and/or from the electronic storage 112 as shown in FIG. 2). At block 508, the character module 108 updates the information defining the character's personality based on the information regarding the user as described above. For example, the character module 108 may detect a change in information regarding the user (e.g., a new skill acquired, a new mission completed, a new taste, a newly discovered personality of the user). In response to such a change in information regarding the user, the character module 108 may update the information defining the character's personality, in a sense that enables the character to "learn" from the user and evolve the character's personality accordingly as described above.

At block 510, in operation, the character module 108 acquires information regarding the character. Such information may include missions completed by the character, events within the virtual space participated in by the character, skill levels of the character, physical attributes, gender, and any other suitable information that may be associated with a character within the virtual space.

At decision block 512, in operation, the character module 108 determines whether the user has customized a personality of the character. As described above, in some implementations, the user may customize a personality of a character through dialogues, selection panels such as dials or bars and/or any other suitable means provided by the character module 108 and/or other modules of system 100. In those implementations, at block 512, the character module 108 recognizes that there is a user customization of the character's personality and proceeds to block 514 to acquire the user's customization of the character's personality. In some other implementations, the character module 108 recognizes that such a user's customization does not exist, and proceeds to block 516. At block 516, the character module 108 determines information defining personality of the character, for example, based on the information regarding the user, information regarding the character, and/or customization made by the user as described above.

It is also understood that the ordering of operations described in FIG. 5 may vary in some other examples. For example, blocks 512 and 514 may be processed prior to blocks 504-510, and block 510 may be processed in parallel with blocks 506, 508. One of ordinary skill in the art will recognize any other suitable ordering of operations described in FIG. 5.

Figure 6:
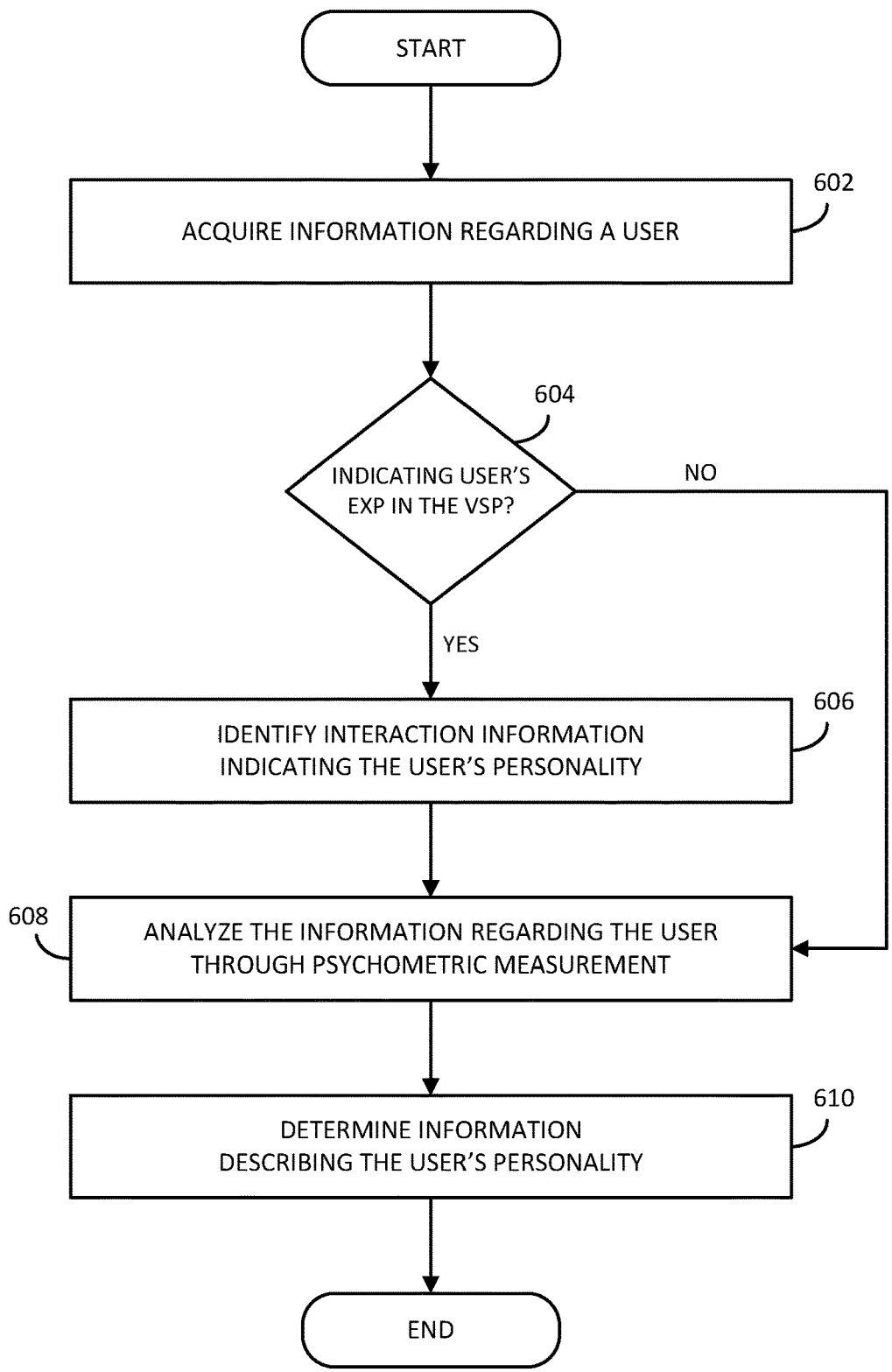
FIG. 6 is a flowchart illustrating one example of a method for determining information describing a user's personality.

FIG. 6 is a flowchart illustrating one example of a method for determining information describing a user's personality. It will be described with references to FIGS. 1-2. As shown, at block 602, in operation, the method acquires information regarding a user (e.g., at the user module 110). As described above, information regarding the user may include information indicating the user's personality, activities, traits such as skill levels, tastes, preferences, achievements, currencies, and any other suitable information that may be gathered and managed based on user's experiences within the virtual space. The information regarding user may also be acquired by the user module 110 from sources external to the virtual space, such as another virtual space, websites related to the virtual space (e.g., public or private forums for sharing user's experience within the virtual space), social network of Facebook™, MySpace, Twitter, microblogs, and/or any other suitable sources that may provide information indicating a user's personality and/or preferences as described above.

At decision block 604, in operation, the user module 110 determines whether the information regarding the user indicates the user's experiences in the virtual space. In some examples, the user module 110 recognizes that the information regarding the user indicates the user's experiences in the virtual space and proceeds to block 606. In some other examples, the user module 110 recognizes that the information regarding the user does not indicate the user's experiences in the virtual space and proceeds to block 608.

At block 606, the user module 110 identifies the user's interaction with the virtual space that may indicate the user's personality as described above. For example, the user module 110 may identify the user's interaction with the avatar associated with user, such as but not limited to, after the avatar completes a difficult task under the control of the user, which may indicate certain personality traits of the user. At block 608, the user module 110 analyzes such information through psychometric measurement. At block 610, the user module 110 determines information indicating the user's personality (e.g. in the forms of personality models transcribed to a file or memory sections residing on electronic storage 112).

It is still understood, the ordering of operations described in FIG. 6 may vary in some other examples. One of ordinary skill in the art will recognize any other suitable ordering of operations describe in FIG. 6.

Figure 7:
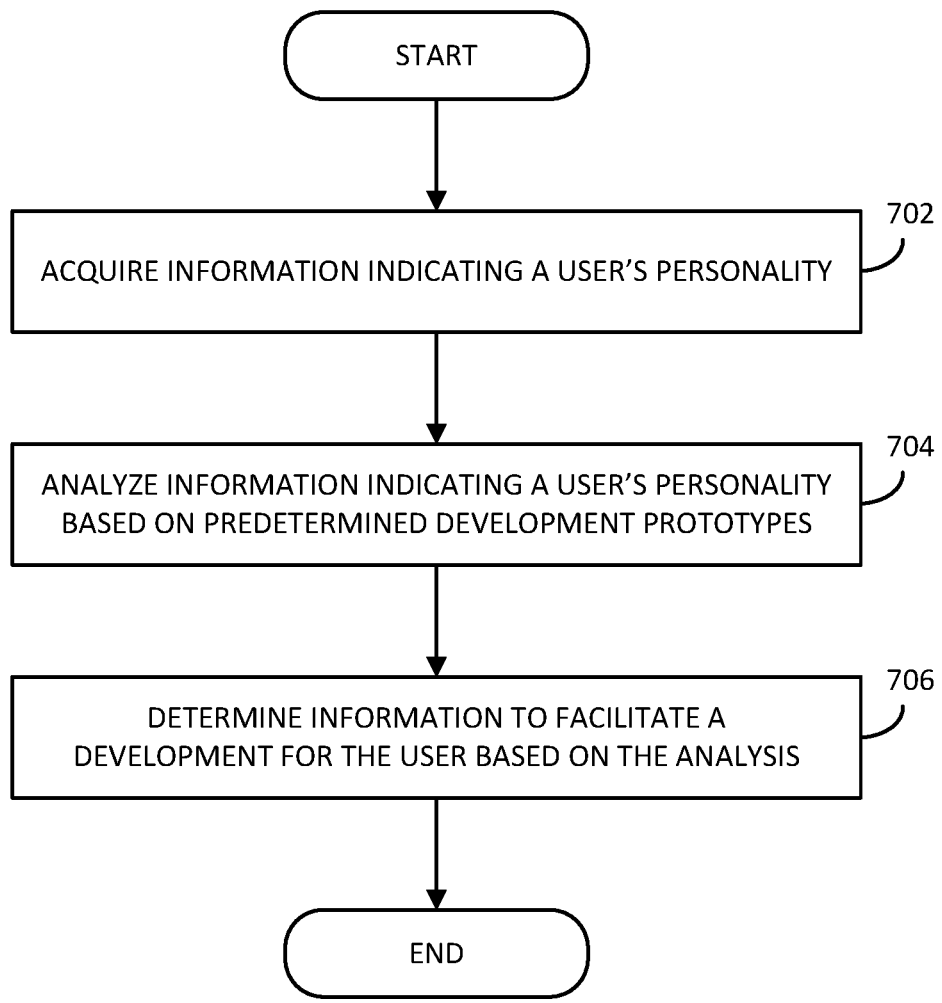
FIG. 7 is a flowchart illustrating one example of a method for determining information to facilitate development of the user.

FIG. 7 is a flow chart illustrating one example of a method for determining information that facilitates a development of a user. It will be described with references to FIGS. 1-2. At block 702, the method acquires information indicating a user's personality (e.g., at the user development module 116 from the user module 110 via control commands as shown in FIG. 2). At block 704, in operation, the user development module 116 may analyze the information based on predetermined development prototypes. For example, a social skill prototype might be predetermined by an administrator, a supervisor of the user, a caregiver of the user, and/or any other suitable entity that may determine such a prototype. The social skill prototype may be configured to include developmental milestones, goals, stages, measurements and/or any other suitable parameters to develop social skills. Based on such a prototype, the user development module 116 may be configured to analyze, for example, a development stage or milestone associated with the user's personality profile, for example as determined by the user module 110. At block 706, in operation, based such an analysis, the user development module 116 determines information to facilitate a development for the user. This may include information that causes the user to develop into the next stage, milestone, goal and/or any other suitable measurements according to the developmental prototype.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for providing a virtual space, comprising:
analyzing, on one or more processors, information associated with a user to determine a first personality associated with the user;
determining, on the one or more processors, a second personality associated with an artificial intelligence character configured to engage in one or more interactive exchanges with the user within the virtual space based at least in part on the first personality associated with the user, wherein behavior of the artificial intelligence character within the virtual space is based at least in part on the second personality associated with the artificial intelligence character, and wherein the second personality associated with the artificial intelligence character is determined to provide a therapeutic impact to the user during the one or more interactive exchanges between the user and the artificial intelligence character in the virtual space; and
generating, on the one or more processors, a representation associated with the virtual space based at least in part on the second personality associated with the artificial intelligence character, wherein the representation configures the artificial intelligence character such that the second personality associated with the artificial intelligence character at least partially influences one or more manifested behaviors of the artificial intelligence character during the one or more interactive exchanges.

2. The method recited in claim 1, wherein the representation associated with the virtual space is generated to develop a relationship between the user and the artificial intelligence character.

3. The method recited in claim 1, wherein the representation associated with the virtual space causes the artificial intelligence character to behave in a manner that explicitly conveys the second personality associated with the artificial intelligence character.

4. The method recited in claim 1, wherein the representation associated with the virtual space causes the artificial intelligence character to behave in a manner that implicitly conveys the second personality associated with the artificial intelligence character.

5. The method recited in claim 1, wherein the representation associated with the virtual space causes the artificial intelligence character to implicitly convey an emotional feeling that reflects the second personality according to one or more of a facial expression or body language.

6. The method recited in claim 5, wherein the representation associated with the virtual space causes the artificial intelligence character to maintain the facial expression or the body language for a length of time to convey a depth or persistence of the emotional feeling.

7. The method recited in claim 1, further comprising generating the representation associated with the virtual space based on the first personality associated with the user.

8. The method recited in claim 1, further comprising:
determining an emotional state associated with the user; and
adapting the representation associated with the virtual space such that the artificial intelligence character responds to the emotional state associated with the user in a manner that reflects the first personality associated with the user and the second personality associated with the artificial intelligence character.

9. The method of claim 8, wherein the representation associated with the virtual space is adapted to provide the therapeutic impact to the user through a decrease in a symptomatology of the emotional state associated with the user.

10. The method of claim 1, further comprising receiving input from a caregiver of the user specifying one or more developmental goals for the user, wherein the second personality associated with the artificial intelligence character is determined to provide the therapeutic impact according to the one or more developmental goals for the user.

11. The method recited in claim 1, wherein the representation associated with the virtual space causes the artificial intelligence character to behave in a manner that encourages the user to participate in activities within the virtual space that differ from prior experiences in the virtual space.

12. The method recited in claim 1, wherein the information used to determine the first personality associated with the user is analyzed according to psychometric measurement.

13. The method recited in claim 1, wherein the information used to determine the first personality associated with the user is received from a caregiver of the user.

14. The method recited in claim 1, further comprising gathering the information used to determine the first personality associated with the user through the user participating in one or more experiences within the virtual space.

15. The method recited in claim 1, further comprising:
providing the user with a questionnaire comprising one or more direct questions about interests and feeling states; and
gathering the information used to determine the first personality associated with the user through answers that the user provided to the questionnaire.

16. The method recited in claim 1, wherein the representation associated with the virtual space is generated to suggest one or more real-world experiences to the user based at least in part on the first personality associated with the user.

17. A method for encouraging user development, comprising:
determining, on one or more processors, a first personality associated with a user;
determining, on the one or more processors, a therapeutic impact to be provided to the user during one or more interactive exchanges between the user and a virtual character;
determining, on the one or more processors, a second personality associated with the virtual character based at least in part on the first personality associated with the user and the therapeutic impact to be provided to the user; and
controlling, on the one or more processors, behavior associated with the virtual character during the one or more interactive exchanges between the user and the virtual character based on at least the first personality and the second personality, wherein the controlled behavior includes one or more manifested behaviors of the virtual character during the one or more interactive exchanges that are influenced by the second personality associated with the virtual character and intended to provide the therapeutic impact to the user.

18. The method recited in claim 17, wherein the one or more interactive exchanges between the user and the virtual character includes one or more dialogues in which the virtual character acts as a mentor to the user.

19. The method recited in claim 17, further comprising:
determining one or more experiences in which the user has engaged;

updating the first personality associated with the user and the therapeutic impact to be provided to the user to reflect the one or more experiences in which the user has engaged; and adapting the second personality associated with the virtual character to reflect the updated first personality associated with the user and the updated therapeutic impact to be provided to the user.

20. The method recited in claim 19, further comprising:

determining that the one or more experiences in which the user has engaged are associated with a first developmental prototype; and causing the virtual character to suggest, during the one or more interactive exchanges with the user, one or more additional experiences to achieve further milestones defined within the first developmental prototype or to achieve milestones defined in a second developmental prototype, wherein the virtual character suggests the one or more additional experiences in a manner that reflects the first personality associated with the user, the second personality associated with the virtual character, and the therapeutic impact to be provided to the user.

21. The method recited in claim 17, wherein the one or more interactive exchanges between the user and the virtual character includes one or more dialogues in which the virtual character comments on one or more activities the user has performed within a virtual space.

* * * * *